(12) United States Patent  
Keshavarz et al.

(10) Patent No.: US 8,541,121 B2  
(45) Date of Patent: Sep. 24, 2013

(54) QUENCHING SYSTEM

(75) Inventors: Majid Keshavarz, Pleasanton, CA (US); Saroj Kumar Sahu, Mountain House, CA (US); Ge Zu, San Jose, CA (US)

(73) Assignee: Deeya Energy, Inc., Fremont, CA (US)

( * ) Notice: Subject to any disclaimer, the term of this patent is extended or adjusted under 35 U.S.C. 154(b) by 212 days.

(21) Appl. No.: 13/006,151

(22) Filed: Jan. 13, 2011

(65) Prior Publication Data

US 2012/0183816 A1 Jul. 19, 2012

(51) Int. Cl.  
*H01M 2/38* (2006.01)  
*H01M 10/34* (2006.01)  
*H01M 10/52* (2006.01)  
*H01M 4/36* (2006.01)  
*H01M 6/24* (2006.01)  
*H01M 4/48* (2010.01)  
*H01M 6/20* (2006.01)  
*H01M 6/00* (2006.01)  
*H01M 10/00* (2006.01)  
*C25B 1/00* (2006.01)  
*C25B 3/00* (2006.01)  
*C25C 1/00* (2006.01)

(52) U.S. Cl.  
USPC ............... 429/51; 429/57; 429/101; 429/105; 429/107; 429/109; 429/122; 320/100; 320/107; 320/137; 320/166; 205/334; 205/335; 205/615; 205/618; 205/620; 73/1.02; 73/19.1; 73/655; 422/82.05; 422/91

(58) Field of Classification Search  
USPC ............... 429/46, 51, 57, 101, 105, 107, 109, 429/122; 320/100, 107, 137, 166; 205/334, 205/335, 615, 618, 620; 73/1.02, 19.1, 655; 422/82.05, 91, 655  
See application file for complete search history.

(56) References Cited

U.S. PATENT DOCUMENTS

| | | | |
|---|---|---|---|
| 3,881,893 A | | 5/1975 | Badhwar |
| 3,996,064 A | * | 12/1976 | Thaller ..................... 320/128 |
| 4,159,366 A | | 6/1979 | Thaller |
| 4,576,878 A | * | 3/1986 | Gahn ........................... 429/51 |
| 4,732,827 A | * | 3/1988 | Kaneko et al. ............ 429/202 |
| 4,874,483 A | | 10/1989 | Wakabayashi et al. |
| 5,064,632 A | | 11/1991 | Bonsack |
| 5,547,637 A | * | 8/1996 | Clair et al. ................. 422/129 |
| 6,551,521 B1 | | 4/2003 | Culpovich et al. |

(Continued)

FOREIGN PATENT DOCUMENTS

JP H06-325784 * 11/1994

OTHER PUBLICATIONS

EPA-670/ 2- 73 -053-h Aug. 1973 "Recommended Methods of Reduction Neutralization Recovery or Disposal of Hazardous Waste vol. III, Miscellaneous Organic and Inorganic Compounds".*

(Continued)

*Primary Examiner* — Patrick Ryan  
*Assistant Examiner* — Aaron Greso  
(74) *Attorney, Agent, or Firm* — Haynes and Boone LLP

(57) ABSTRACT

A quencher for a flow cell battery is described. The quencher utilizes a quench solution formed from $FeCl_2$ in a dilute HCl solution in order to quench chlorine emissions from the flow cell battery. A quench sensor is further described. The quench sensor monitors the concentration level of $FeCl_2$ in the quench solution and may also monitor the level of the quench solution in the quencher.

16 Claims, 7 Drawing Sheets

(56) References Cited

U.S. PATENT DOCUMENTS

| | | |
|---|---|---|
| 6,770,225 B2 | 8/2004 | Nilsen et al. |
| 7,855,005 B2 | 12/2010 | Sahu |
| 7,919,204 B2 | 4/2011 | Sahu |
| 7,927,731 B2 | 4/2011 | Sahu |
| 2008/0193828 A1* | 8/2008 | Sahu ............... 429/63 |
| 2009/0218984 A1 | 9/2009 | Parakulam |
| 2010/0003586 A1 | 1/2010 | Sahu |
| 2010/0089480 A1 | 4/2010 | Sahu et al. |
| 2010/0090651 A1 | 4/2010 | Sahu et al. |
| 2010/0092757 A1 | 4/2010 | Nair et al. |
| 2010/0092807 A1 | 4/2010 | Sahu et al. |
| 2010/0092843 A1 | 4/2010 | Conway |
| 2010/0094468 A1 | 4/2010 | Sahu et al. |
| 2010/0136455 A1 | 6/2010 | Winter |
| 2010/0143781 A1 | 6/2010 | Keshavarz et al. |
| 2010/0261070 A1 | 10/2010 | Keshavarz et al. |
| 2011/0070483 A1 | 3/2011 | Keshavarz et al. |
| 2011/0074357 A1 | 3/2011 | Parakulam et al. |
| 2011/0076526 A1 | 3/2011 | Zu et al. |
| 2011/0079074 A1 | 4/2011 | Sahu |
| 2011/0080143 A1 | 4/2011 | Parakulam et al. |
| 2011/0081561 A1 | 4/2011 | Keshavarz et al. |
| 2011/0081562 A1 | 4/2011 | Parakulam et al. |
| 2011/0086247 A1 | 4/2011 | Keshavarz et al. |

OTHER PUBLICATIONS

International Search Report and Written Opinion dated Apr. 30, 2013 from related International Application No. PCT/US2012/021118, 10 pages.

Draft Environmental Impact Report, City of South Gate LA Water, LLC Chemical Manufacturing Facility [online], Aug. 2009, 260 pages.

* cited by examiner

QUENCHING SYSTEM

TECHNICAL FIELD

The present invention is related to quenching emissions from a flow cell battery.

DISCUSSION OF RELATED ART

Reduction-oxidation (redox) flow batteries store electrical energy in a chemical form, and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible; the electrolyte can be recharged without replacing the electroactive material. The energy capacity of a redox flow battery, therefore, is related to the total electrolyte volume (i.e., the size of the storage tank). The discharge time of a redox flow battery at full power also depends on electrolyte volume and can vary from several minutes to many days.

The minimal unit that performs the electrochemical energy conversion is generally called a "cell," whether in the case of flow batteries, fuel cells, or secondary batteries. A device that integrates many such cells, coupled electrically in series and/or parallel to get higher current, voltage, or both, is generally called a "battery." However, it is common to refer to any collection of coupled cells, including a single cell used on its own, as a battery. As such, a single cell can be referred to interchangeably as a "cell" or a "battery."

Redox flow batteries can be utilized in many technologies that require the storage of electrical energy. For example, redox flow batteries can be utilized to store night-time electricity that is inexpensive to produce, and to subsequently provide electricity during peak demand when electricity is more expensive to produce or demand is beyond the capability of current production. Such batteries can also be utilized for storage of green energy (i.e., energy generated from renewable sources such as wind, solar, wave, or other non-conventional sources). Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure in a generating station.

However, one effect of operating a flow cell battery is emissions. In a flow cell battery that utilizes a Fe/Cr chemistry for its electrolytes, one prominent emission of the process is chlorine.

Therefore, there is a need to reduce the emissions from a flow cell battery.

SUMMARY

In accordance with some embodiments of the present invention, a quench system can include a quench solution, the quench solution include $FeCl_2$ in a dilute HCl solution; a container holding the quench solution, the container including an input that directs a gaseous emission into the quench solution, wherein Cl2 gas is removed from the gaseous emission by the quench solution. The Cl2 gets reduced by the quench solution which is a mild reducing agent through a reaction given by $$2FeCl_2 + Cl_2 \rightarrow 2FeCl_3.$$

Iron metal filings (or Iron chips or Iron powder) may be added to help revitalize (replenish) the quench solution through the reaction $$Fe + 2FeCl_3 \rightarrow 3FeCl_2.$$

A quench sensor can be utilized to monitor the quench solution. In particular, the quench sensor can include a source that emits light at an $FeCl_2$ absorption spectrum region, the source and a corresponding detector being positioned such that an absorption through the quench solution is measured. An indication that the $FeCl_2$ concentration is low is provided by an absorption less than a threshold value. The quench sensor may further include a source that emits light at a $CrCl_3$ absorption peak and the source and the corresponding detector are positioned such that an absorption through a volume normally above the quench solution, to which $CrCl_3$ has been added, is measured. A measurable $CrCl_3$ absorption indicates a rise in the level of quench solution in the quencher.

A method of quenching chlorine from an exhaust gas includes passing the exhaust gas through a quench solution that includes $FeCl_2$ in a dilute HCl solution, wherein the chlorine is captured (reduced) in a reaction with the $FeCl_2$ given by $$2FeCl_2 + Cl_2 \rightarrow 2FeCl_3.$$

The method may further including monitoring the quench solution for $FeCl_2$ concentration and level.

A flow cell battery can then include a cell coupled to electrolyte tanks; a rebalance cell coupled to receive emissions from one of the electrolyte tanks; and a quencher coupled to receive emissions from the rebalance cell, the quencher including a quench solution that removes chlorine from emissions from the rebalance cell.

These and other embodiments of the invention are further described below with respect to the following figures.

In the figures, elements having the same designation have the same or similar functions. The figures are illustrative only and relative sizes and distances depicted in the figures are for convenience of illustration only and have no further meaning.

DETAILED DESCRIPTION

In the following description, for the purposes of explanation, specific details are set forth in order to provide a thorough understanding of some e embodiments of the invention. However, it will be apparent that the invention may be practiced without these specific details.

As used in the present specification, the following words and phrases are generally intended to have the meanings as set forth below, except to the extent that the context in which they are used indicates otherwise.

As described herein, the term "cell" refers generally to any unit capable of performing electrochemical energy conversion. Exemplary cells include, but are not limited to, redox flow batteries, fuel cells, and secondary batteries.

As described herein, the term "membrane" refers to any material that forms a barrier between fluids, for example between electrochemical half-cells (e.g., an anode compartment and a cathode compartment). Exemplary membranes may be selectively permeable, and may include porous membranes and ion-selective membranes. Exemplary membranes may include one or more layers, wherein each layer exhibits a selective permeability for certain species (e.g., ions), and/or affects the passage of certain species.

As described herein, the term "fluid communication" refers to structures which are in contact with, but not necessarily affixed to, one another, whereby a fluid or gas can pass from one structure to the other. For example, two structures may be in fluid communication with one another by a channel, conduit, opening, and/or valve, even if the communication includes a valve in a closed state but provided that the valve may be opened, whereby a fluid or gas may be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

As described herein, the "chromium side" of a cell refers generally to the negative side of a Cr/Fe based redox flow cell. In some embodiments, the oxidation of chromium occurs at the chromium side of the cell.

As described herein, the "iron side" of a cell refers generally to the positive side of a Cr/Fe based redox flow cell. In some embodiments, the reduction of iron occurs at the iron side of the cell.

Figure 1:
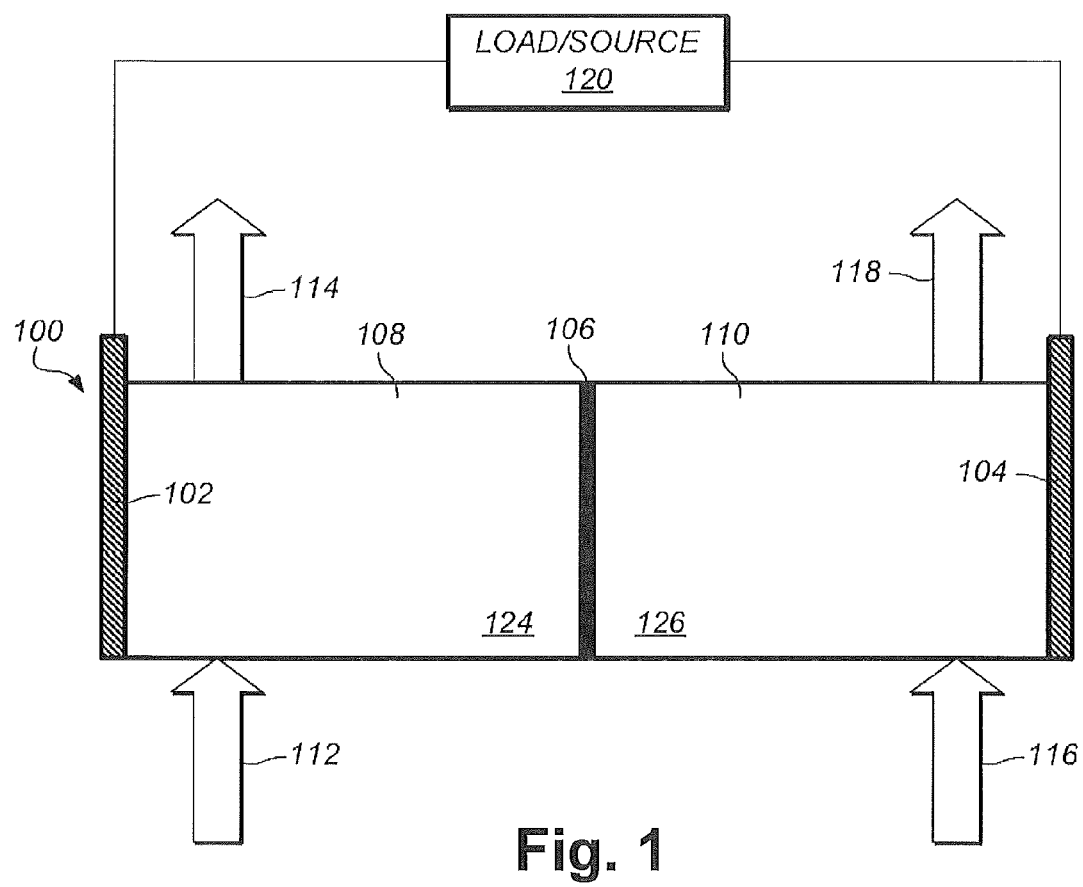
FIG. 1 illustrates a reduction-oxidation (redox) cell according to some embodiments of the present invention.

FIG. 1 illustrates a schematic drawing of a simplified redox flow cell battery system 100. As shown, redox flow cell system includes redox flow cell 100, which includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104, respectively, in contact with electrolytes 124 and 126, respectively, such that redox reactions occur at the surface of the electrodes 102 or 104. In some embodiments, multiple redox flow cells 100 may be electrically coupled (e.g., stacked) either in series to achieve higher voltage or in parallel in order to achieve higher current. The stacked cells are collectively referred to as a battery stack and flow cell battery can refer to a single cell or battery stack. As shown in FIG. 1, electrodes 102 and 104 are coupled across load/source 120, through which electrolytes 124 and 126 are either charged or discharged.

When filled with electrolyte, half-cell 110 of redox flow cell 100 contains anolyte 126 and the other half-cell 108 contains catholyte 124, the anolyte and catholyte being collectively referred to as electrolytes. Reactant electrolytes may be stored in separate reservoirs and dispensed into half-cells 108 and 110 via conduits coupled to cell inlet/outlet (I/O) ports 112, 114 and 116, 118 respectively. In some embodiments, an external pumping system is used to transport the electrolytes to and from the redox flow cell. Electrolyte 124 flows into half-cell 108 through inlet port 112 and out through outlet port 114, while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Redox flow cell 100 operates by changing the oxidation state of its constituents during charging or discharging. The two half-cells 108 and 110 are connected in series by the conductive electrolytes, one for anodic reaction and the other for cathodic reaction. In operation (e.g., during charge or discharge), electrolytes 126 and 124 are flowed through half-cells 108 and 110 through I/O ports 112, 114 and 116, 118 respectively as the redox reaction takes place.

Positive ions or negative ions pass through permeable membrane 106, which separates the two half-cells 108 and 110, as the redox flow cell 100 charges or discharges. Reactant electrolytes are flowed through half-cells 108 and 110, as necessary, in a controlled manner to supply electrical power or be charged by load/source 120. Suitable membrane materials for membrane 106 include, but are not limited to, materials that absorb moisture and expand when placed in an aqueous environment. In some embodiments, membrane 106 may comprise sheets of woven or non-woven plastic with active ion exchange materials such as resins or functionalities embedded either in a heterogeneous (such as co-extrusion) or homogeneous (such as radiation grafting) way. In some embodiments, membrane 106 may be a porous membrane having high voltaic efficiency Ev and high coulombic efficiency and may be designed to limit mass transfer through the membrane to a minimum while still facilitating ionic transfer. In some embodiments, membrane 106 may be made from a polyolefin material and may have a specified thickness and pore diameter. A manufacturer having the capability to manufacture these membranes, and other membranes consistent with embodiments disclosed, is Daramic Microporous Products, L.P., N. Community House Rd., Suite 35, Charlotte, N.C. 28277. In certain embodiments, membrane 106 may be a nonselective microporous plastic separator also manufactured by Daramic Microporous Products L.P. A flow cell formed from such a membrane is disclosed in U.S. Published Patent App. No. 2010/0003586, filed on Jul. 1, 2008, which is incorporated herein by reference in its entirety.

In some embodiments, multiple redox flow cells may be stacked to form a redox flow cell battery system. Construction of a flow cell stack battery system is described in U.S. patent application Ser. No. 12/577,134, entitled "Common Module Stack Component Design" filed on Oct. 9, 2009, which is incorporated herein by reference.

In some embodiments of redox flow cell 100 in FIG. 1, electrolyte 124 includes an aqueous acid solution. In some embodiments, the acidic solution includes aqueous hydrochloric acid. Electrolyte 124 further includes at least one metal salt (e.g., a metal chloride salt). In some embodiments, electrolyte 126 comprises an aqueous acid solution. In some embodiments, the acidic solution includes aqueous hydrochloric acid. Electrolyte 126 further includes at least one metal salt (e.g., a metal chloride salt).

In one embodiment, a redox flow cell battery system is based on a Cr/Fe redox pair. The remainder of the description will be based on a Cr/Fe redox flow cell battery, however, it should be understood that the concepts described herein may also be applied to other metals. In an embodiment of a Cr/Fe redox flow cell battery, both electrolytes 124 and 126 include a solution of $FeCl_2$ and $CrCl_3$ in aqueous HCl.

Figure 2:
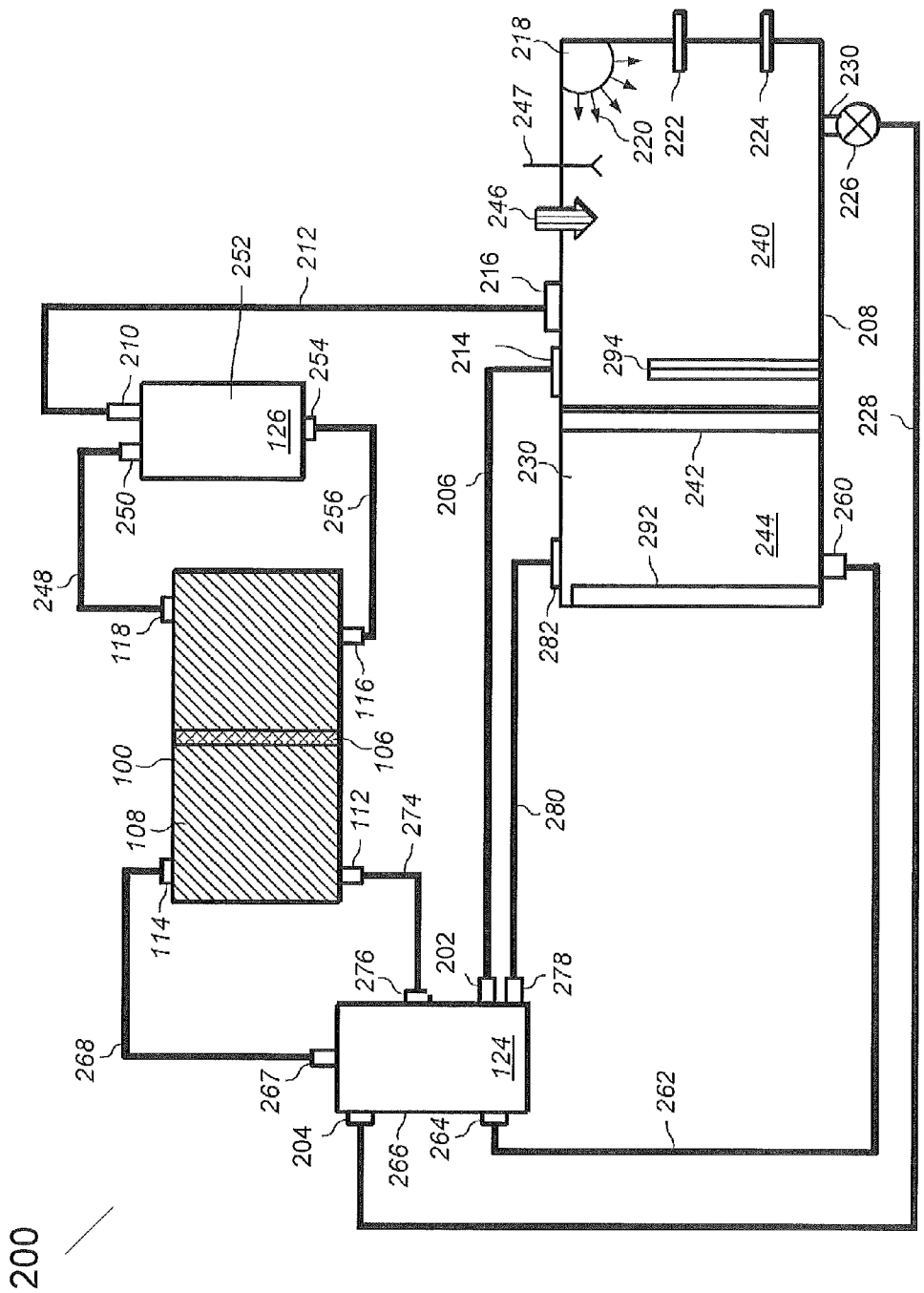
FIG. 2 is a simplified block diagram of a redox cell coupled to a rebalancing system consistent with some embodiments of the present invention.

FIG. 2 illustrates a redox flow cell battery system 200 that includes redox flow cell 100 coupled to rebalancing cell (RBC) 208. For convenience only, redox flow cell 100 is illustrated with a single cell that includes half-cell compartment 108 and half-cell compartment 110 separated by membrane 106. $H_2$ collected in compartment 110 may be transferred from redox cell 100 through conduit 248 and into reservoir 252 through inlet 250, which also contains electrolyte 126. From there, $H_2$ may be vented from outlet 210 and carried along conduit 212 and into anode compartment 240 of rebalance cell 208 via inlet 216. Rebalance cell 208 also houses cathode compartment 244. Anode compartment 240 and cathode compartment 244 are separated by ion exchange membrane 242. Cathode compartment 244 contains cathode 292, while anode compartment 240 contains anode 294.

When electrolyte in anode compartment 240 comprises aqueous HCl, the process of oxidation will effect the formation of $Cl_2$ at anode 294, which then collects at the top of anode compartment 240. $H_2$ introduced through inlet 216 also collects at the top of anode compartment 240. Anode compartment 240 includes ultraviolet source 218, which may be used to expose the $H_2$ and $Cl_2$ to ultraviolet radiation 220. Ultraviolet source 218 may be encapsulated by a shell to protect it from exposure to substances (e.g., $Cl_2$ and $H_2$) within anode compartment 240. The exposure of $H_2$ and $Cl_2$ to ultraviolet radiation 220 effects the formation of HCl, which then dissociates in the aqueous catholyte as H+ and Cl−. The heat and pressure resulting from the operation of ultraviolet source 218 may be closely monitored by sensors 246. $H_2$ and $Cl_2$ concentrations may be monitored through gas sensor 247.

Permeable membrane 242 may allow for the passage of H$^+$ into cathode compartment 244 and the aqueous electrolyte contained therein. This passage typically results in a drop in the electrolyte volume in anode compartment 240. The level of electrolyte in anode compartment 240 is controlled to be between lower sensor 224 and upper sensor 222. In some embodiments, a drop in electrolyte level detected by lower sensor 224 will stop the flow of power and effect the draining of electrolyte through outlet 230 and valve 226. From there, the electrolyte may be transported along conduit 228 and into reservoir 266 via inlet 204. Electrolyte may then be flowed from outlet 202 and along conduit 206 to refill anode compartment 240 via inlet 214. In some embodiments, valve 226 may remain open for some period of time after electrolyte begins to fill anode compartment 240 in order to flush compartment 240. Once anode compartment 240 is refilled, power is once again applied to electrodes 294 and 292 to begin production of chlorine gas.

In some embodiments, the refilling of anode compartment 240 may be accomplished by a second arm from conduit 274. For example, in some embodiments, redox flow cell battery system 200 may lack conduit 206. Thus, in some embodiments, a second arm off of conduit 274 (not shown) may be implemented to affect the transfer of electrolyte to anode compartment 240 via inlet 214 for refilling. In some embodiments, valve(s) may be implemented to control the fill.

Passage of H$^+$ into cathode compartment 244 will result in a rise in the level of the electrolyte and H$^+$ present therein. Restoration of the appropriate electrolyte level may be achieved by draining a volume of the electrolyte through conduit 262 via outlet 260. The electrolyte is transported along conduit 262 and into reservoir 266 via inlet 264. There, the electrolyte may be equilibrated and again dispelled via outlet 278. Equilibrated electrolyte from reservoir 266 may be used to replace the electrolyte drained from cathode compartment 244 through conduit 280 and inlet 282.

Alternatively, in some embodiments, electrolyte from cathode compartment 244 may be placed in fluid communication with reservoir 266 by other means. For example, in some embodiments, redox flow cell battery system 200 may lack conduit 262. Thus, in some embodiments, a second arm from conduit 274 may be implemented to affect the transfer of electrolyte from cathode compartment 244 to reservoir 266. In some embodiments, valve(s) may be implemented to control the transfer.

Electrolyte in half-cell compartment 108 of redox flow cell 100 may be drained through outlet 112 and replenished in reservoir 266 via conduit 274 and inlet 276. Replenished electrolyte 124 exits reservoir 266 though outlet 267, which is then transported through conduit 268 and reintroduced into half-cell compartment 108 via inlet 114. Similarly, reservoir 252 feeds electrolyte 126 from outlet 250 into half-cell compartment 110 via conduit 248 and inlet 118. Once depleted, the electrolyte may be drained from half-cell compartment 110 through outlet 116 and transported along conduit 256 for reintroduction into reservoir 252 via inlet 254.

Alternative I/O port and conduit placements will be obvious to persons of ordinary skill in the art. For example, in some embodiments, inlet 346 may be placed at the top of reservoir 266, instead of the side as depicted in FIG. 2. Other rearrangements to I/O port and conduit placements depicted in FIG. 2 are obvious and have the ability to effect similar results.

Descriptions of various details of redox flow cell battery systems can be found in the following U.S. patent applications, all of which are incorporated herein by reference in their entirety: U.S. patent application Ser. No. 11/674,101, entitled "Apparatus and Methods of Determination of State of Charge in a Redox Flow Battery", filed on Feb. 12, 2007; U.S. application Ser. No. 12/074,110, entitled "Battery Charger", filed on Feb. 28, 2008; U.S. patent application Ser. No. 12/217,059, entitled "Redox Flow Cell," filed on Jul. 1, 2008; U.S. patent application Ser. No. 12/576,235, entitled "Magnetic Current Collector" filed on Oct. 8, 2009; U.S. patent application Ser. No. 12/576,240, entitled "Venturi Pumping System in a Hydrogen Gas Circulation of a Flow Battery" filed on Oct. 8, 2009; U.S. patent application Ser. No. 12/576,242, entitled "Method and Apparatus for Determining State of Charge of a Battery" filed on Oct. 9, 2009; U.S. patent application Ser. No. 12/577,124, entitled "Flexible Multi-Walled Tubing Assembly" filed on Oct. 9, 2009; U.S. patent application Ser. No. 12/577,127, entitled "Thermal Control of a Flow Cell Battery" filed on Oct. 9, 2009; U.S. patent application Ser. No. 12/577,131, entitled "Methods for Bonding Porous Flexible Membranes Using Solvent" filed on Oct. 9, 2009; U.S. patent application Ser. No. 12/577,134, entitled "Common Module Stack Component Design" filed on Oct. 9, 2009; U.S. patent application Ser. No. 12/577,147, entitled "Level Sensor for Conductive Liquids" filed on Oct. 9, 2009; U.S. patent application Ser. No. 12/631,749, entitled "Methods for the Preparation and Purification of Electrolytes for Redox Flow Batteries" filed on Dec. 4, 2009; U.S. patent application Ser. No. 12/721,411, entitled "Methods for the Preparation of Electrolytes for Chromium-Iron Redox Flow Batteries" filed on Mar. 10, 2010; U.S. patent application Ser. No. 12/790,793 entitled "Control System for a Flow Cell Battery", filed May 28, 2010; U.S. patent application Ser. No. 12/790,595 entitled "Preparation of Redox Flow Battery Electrolytes from Raw Materials", filed May 28, 2010; U.S. patent application Ser. No. 12/790,601 entitled "Electrolyte Compositions", filed May 28, 2010; U.S. patent application Ser. No. 12/790,794 entitled "Hydrogen Chlorine Level Detector", filed May 28, 2010; U.S. patent application Ser. No. 12/790,749 entitled "Optical Leak Detection Sensor", filed May 28, 2010; U.S. patent application Ser. No. 12/790,783 entitled "Buck-Boost Control Circuit", filed May 28, 2010; U.S. patent application Ser. No. 12/790,753 entitled "Flow Cell Rebalancing", filed May 28, 2010; and U.S. patent application Ser. No. 12/790,613 entitled "Methods of Producing Hydrochloric Acid from Hydrogen Gas and Chlorine Gas", filed May 28, 2010. Each of theses references are herein incorporated by reference in their entirety.

Figure 3:
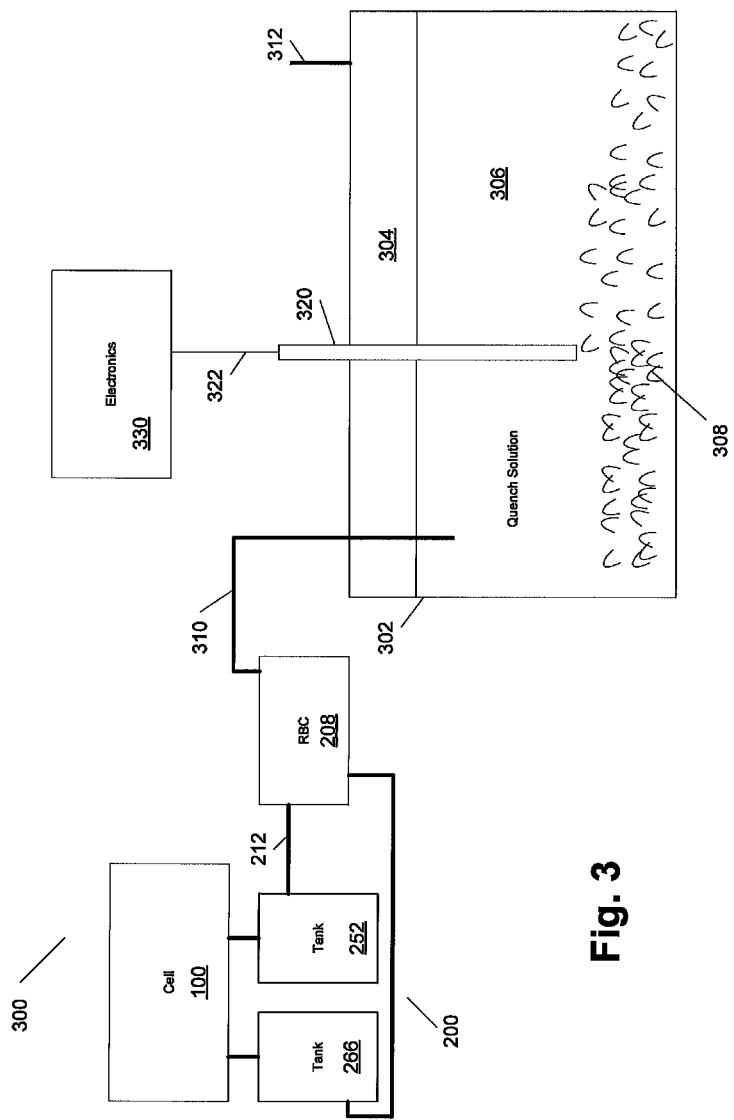
FIG. 3 illustrates a quencher according to some embodiments of the present invention.

FIG. 3 illustrates a flow cell system according to some embodiments of the present invention. An issue that occurs with flow cell system is gaseous emission. In particular, gaseous $H_2$, $H_2O$, HCl, and $Cl_2$ are emitted, particularly from rebalance cell 208. According to the present invention, a quencher 302 can be added to system 200 in order to help remove at least a portion of the HCl and $Cl_2$ from the gaseous emission. As shown in FIG. 3, the gaseous emission is collected in RBC 208 and input to quencher 302 through pipe 310. Quencher 308 holds a quench solution 306 into which the gaseous emission is introduced. Quench solution 306 can, in some embodiments, be a dilute HCl solution containing $FeCl_2$. The gaseous HCl solution can be absorbed in the dilute HCl solution, increasing the acidity of quench solution 306.

Further, the gaseous $Cl_2$ can be captured by quench solution 306. In particular, the $Cl_2$ can be captured in the reaction

$$2FeCl_2 + Cl_2 \rightarrow 2FeCl_3. \qquad (1)$$

In some embodiments, small Fe filings 308 can be added to quench solution 306. In that case, the capacity can be increased through the secondary reaction

$$Fe + 2FeCl_3 \rightarrow 3FeCl_2. \qquad (2)$$

In addition, some side reactions may include the following reactions:

$$Fe + Cl_2 \rightarrow FeCl_2, \text{ and} \qquad (3)$$

$$Fe + 2HCl \rightarrow FeCl_2 + H_2. \qquad (4)$$

At pH levels of around 3 or higher, the following side reactions may also occur:

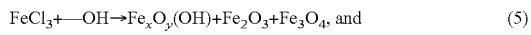
$$FeCl_3 + \text{—OH} \rightarrow Fe_xO_y(OH) + Fe_2O_3 + Fe_3O_4, \text{ and} \qquad (5)$$

$$FeCl_2 + \text{—OH} \rightarrow Fe(OH)_2 + FeO, \qquad (6)$$

where x and y are integers. There may be further reactions that take place as well.

As shown in FIG. 3, quencher 302 is a tank that holds solution 306 and, in some embodiments, iron filings 308. Pipe 310 enters quencher 302 and is submerged below the surface of quench solution 306 so that gaseous emissions from RBC 208 are exhausted into quench solution 306. Gasses that accumulate in section 304 in quencher 302 are then exhausted from quencher 302 through exhaust 312.

As discussed above, quench solution 306 is a dilute HCL solution that includes $FeCl_2$. In some embodiments, a small concentration of $CrCl_3$ can be included in quench solution 306. In some embodiments of the invention, initial quench solution 306 (i.e., quench solution 306 before any quenching activity as occurred) includes about 0.1 M HCl, where M is the molar concentration. However, initial solution 306 may include HCl concentrations in the range 0.1 M to 3.0 M. In some embodiments, initial quench solution 306 can include 1.5 M $FeCl_2$. However, initial solution 306 may include $FeCl_2$ concentrations in the range 0.5 M to 4.0 M. In some embodiments, initial quench solution 306 can include 0.2 M $CrCl_2$. However, initial solution 306 may include $CrCl_2$ solution in the range 0.1 to 2 M. The $CrCl_3$ can provide an optical absorption peak that can be utilized to monitor the level of solution 306 in quencher 302. Other substances may also be added to solution 306 in order to enhance reactions that preserve the efficacy of solution 306 or remove chlorine from the emission. Any amount of iron metal 308 can be added. However, in some embodiments the amount of iron metal 308 added is sufficient to supply iron throughout the lifetime of quench solution 306.

Higher concentrations of HCl and $FeCl_2$ can be utilized. In some embodiments with higher HCl or $FeCl_2$ concentrations, $FeCl_2$ at high concentrations may crystallize.

Through a period of use, quench solution 306 will lose its effectiveness as a quench agent for capturing chlorine and will need to be replaced. The length of time between replacements depends on the size of quencher 302 and the amount of exhaust from flow cell battery 200. A 20 liter tank, where portion 304 is about 3-4" from the top, and pipe 310 is about 1" under the surface of solution 306, where initial solution 306 is 1.5 M $FeCl_2$+0.2 M $CrCl_3$+0.1 M HCl+iron filings can be expected to provide 6 months to 2 years of service depending on the operation of flow cell system 200 and the amount of gaseous emission from RBC 208.

As shown in FIG. 3, a quench sensor 320 can be utilized to monitor the status of quencher 302. $FeCl_2$ in solution absorbs in the near the infra-red (IR) region of the spectrum and develops a broad absorption around a wavelength ($\lambda_m$) at 970 nm, thereby turning an green color. $FeCl_3$, however, in solution absorbs in the Ultraviolet region of the spectrum and develops an absorption around a wavelength ($\lambda_m$) at 340 nm, turning an orange color.

Figure 5:
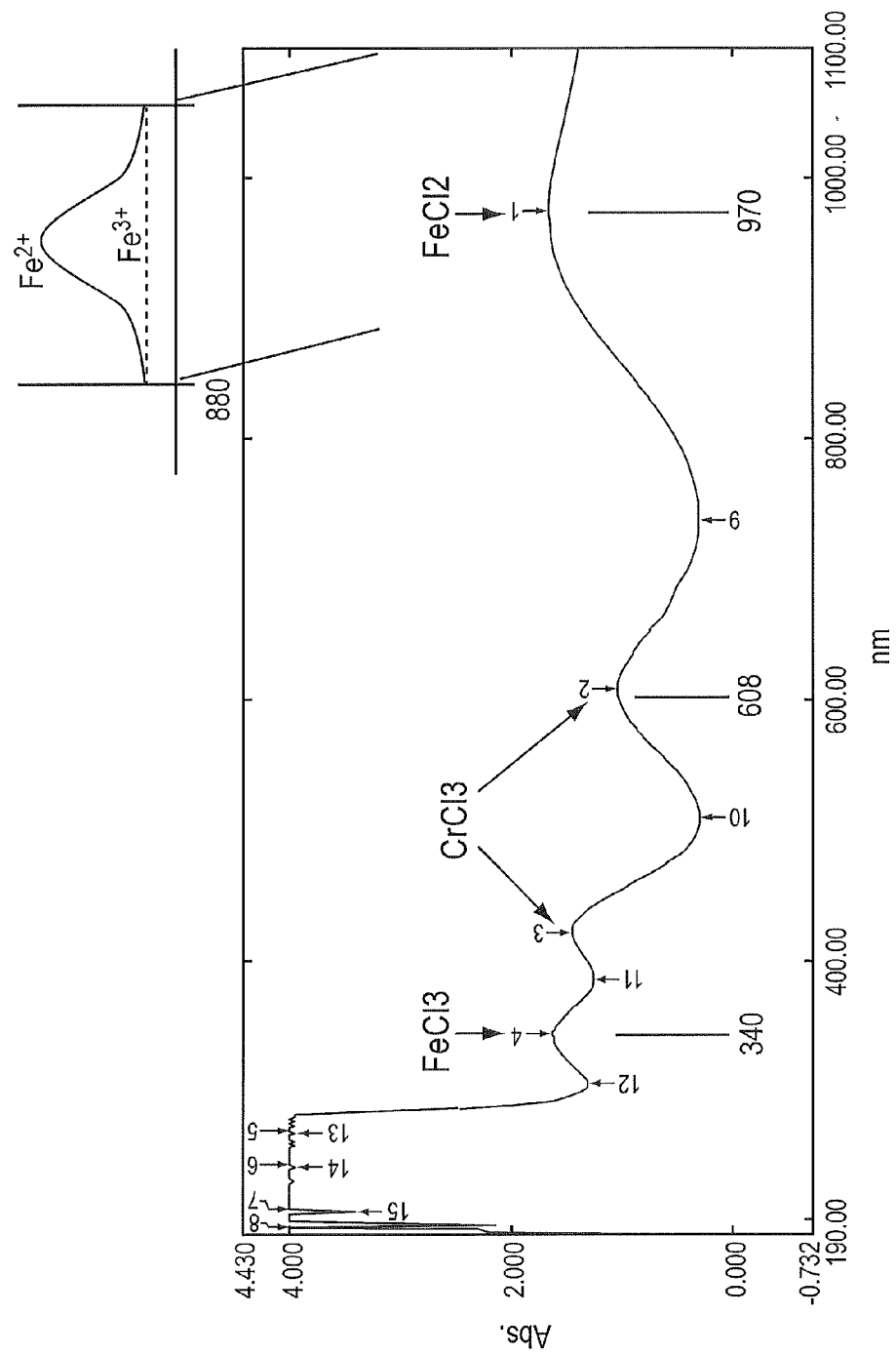
FIG. 5 illustrates optical absorption curves for the quench system monitor according to some embodiments of the present invention.

The optical absorption spectrum of a quench solution 302 is shown in FIG. 5. FIG. 5 illustrates an optical absorption spectrum of a solution 306 that contains both $FeCl_3$ and $FeCl_2$. As shown in FIG. 5, the FeCl3 in solution 306 absorbs in a peak around 340 nm and the $FeCl_2$ in solution 306 absorbs in a broad peak around 970 nm. The excerpt shown in FIG. 5 illustrates absorption spectra of mixed $FeCl_2$ (broad peak centered at 970 nm) and $FeCl_3$ (340 nm) in the region around 970 nm. As illustrated, the optical absorption at 970 nm is an indication of the concentration of $FeCl_2$ in solution 306.

Therefore, as reaction (1) above occurs, the solution turns from green to orange. As reaction (2) occurs, however, the solution will return to a green color. However, when quench solution 306 has been consumed, reaction (2) will not be effective and the concentration of $FeCl_3$ will not decrease while the concentration of $FeCl_2$ will be reduced to near zero levels while the $FeCl_2$ is converted according to reaction (1) into $FeCl_3$.

Figure 4:
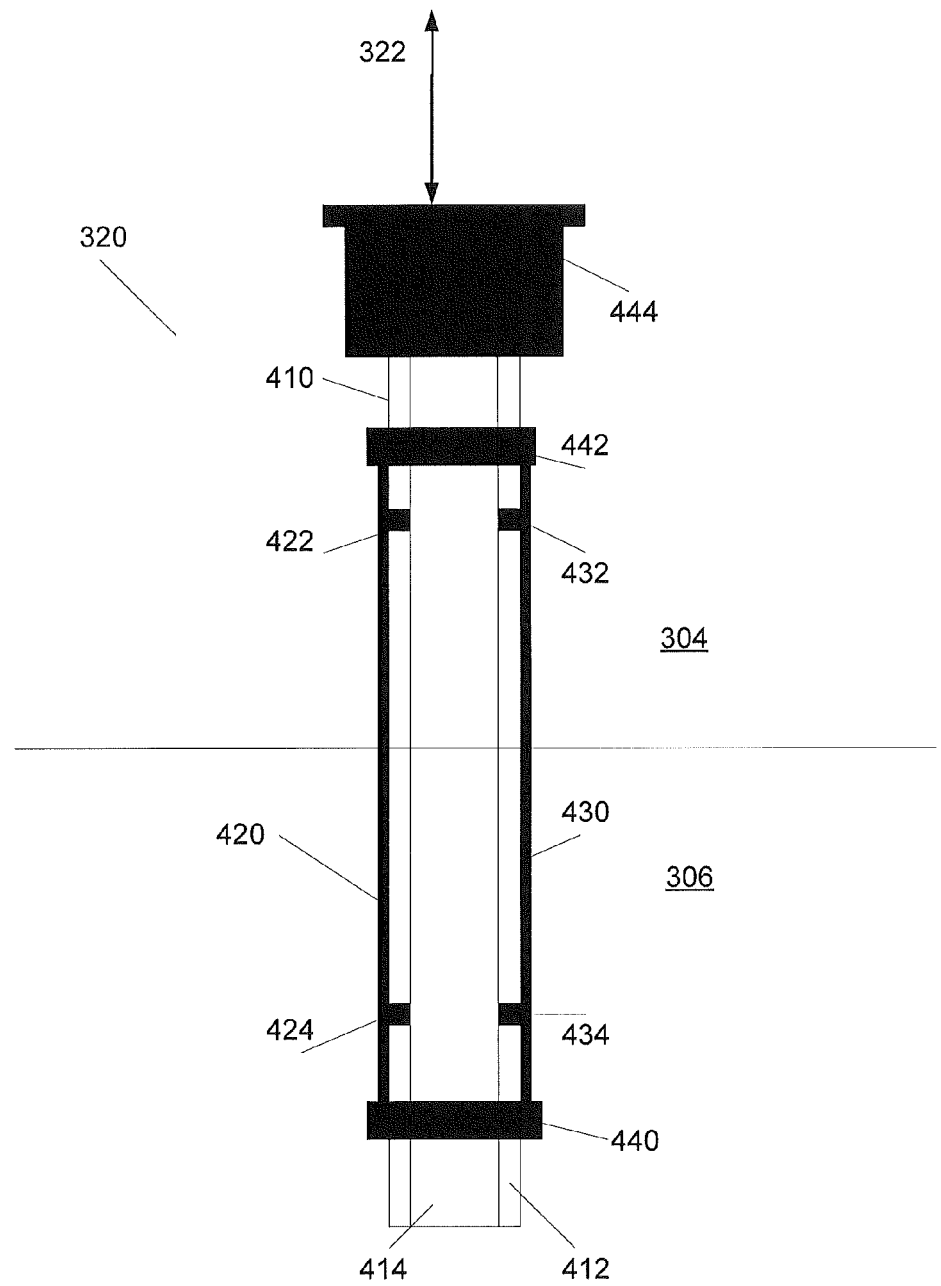
FIG. 4 illustrates a quench sensor according to some embodiments of the present invention.

An example quench sensor 320 is illustrated in FIG. 4. As shown in FIG. 4, quench sensor 320 includes a double walled tubing 410 where inner volume 414 is open and outer volume 412 is sealed. In that fashion, solution 306 can enter inner volume 414. Outer volume 412, however, is protected from quench solution 306. A light source 424 and light detector 434 are mounted in outer volume 412 in such a fashion that light emitted by source 424 is monitored by detector 434, and light between diode 424 and detector 434 passes through quench solution 306.

In some embodiments, source 424 and detector 434 are arranged to monitor the $FeCl_2$ absorption at 970 nm. A reduction of the 970 nm peak below a threshold value indicates that quench solution 306 lacks the concentration of FeCl$_2$ to effectively quench the Cl$_2$ emissions from flow cell 200. In some embodiments, source 424 and detector 434 may be arranged to monitor the FeCl$_3$ absorption peak at 340 nm. In that case, an increase in the 340 nm peak over a particular threshold may indicate saturation of quench solution 306. In some embodiments, quench sensor 320 may include two or more source/receiver pairs below the level of quench solution 306 so that both peaks can be monitored simultaneously.

In some embodiment, quench sensor 320 can also include source 422 and detector 434. Source 422 and detector 434 are arranged above the level of quench solution 306 in portion 304. In that fashion, source 422 and detector 434 can provide an indication if the level of quench solution 306 rises above the level of source 422 and detector 432. In some embodiments, source 422 and detector 432 are arranged to detect absorptions at, for example, 608 nm. As shown in FIG. 5, this region is a flat absorption area indicative of quench solution 306 and not indicative of FeCl$_3$ or FeCl$_2$ levels in quench solution 306. In general, source 422 and detector 432 can be arranged to detect optical absorption at any wavelength that is indicative of quench solution 306. The concentration of CrCl$_3$ in solution 306 heavily absorbs in at 608 nm.

As is further shown in FIG. 4, a stopper 444 is provided on double walled glass tubing 410 so that quench sensor 320 can be positioned into quencher 302 accurately. Further, sources 422 and 424 are mounted on a circuit board 420 while detectors 432 and 434 are mounted on a circuit board 430, which are clamped to double walled tubing 410 by clamps 440 and 442. As discussed above, sources 422 and 424 and detectors 432 and 434 are positioned in outer volume 412. Further, circuit boards 420 and 430 are mounted so as to protect the boards from quench solution 306.

Electrical leads 322 that provide power to sources 422 and 424 as well as collect signals from detectors 432 and 434 protrude through stopper 444. As shown in FIG. 3, leads 322 are coupled to electronics 330. An example of electronics 330 is illustrated in FIG. 6.

Figure 6:
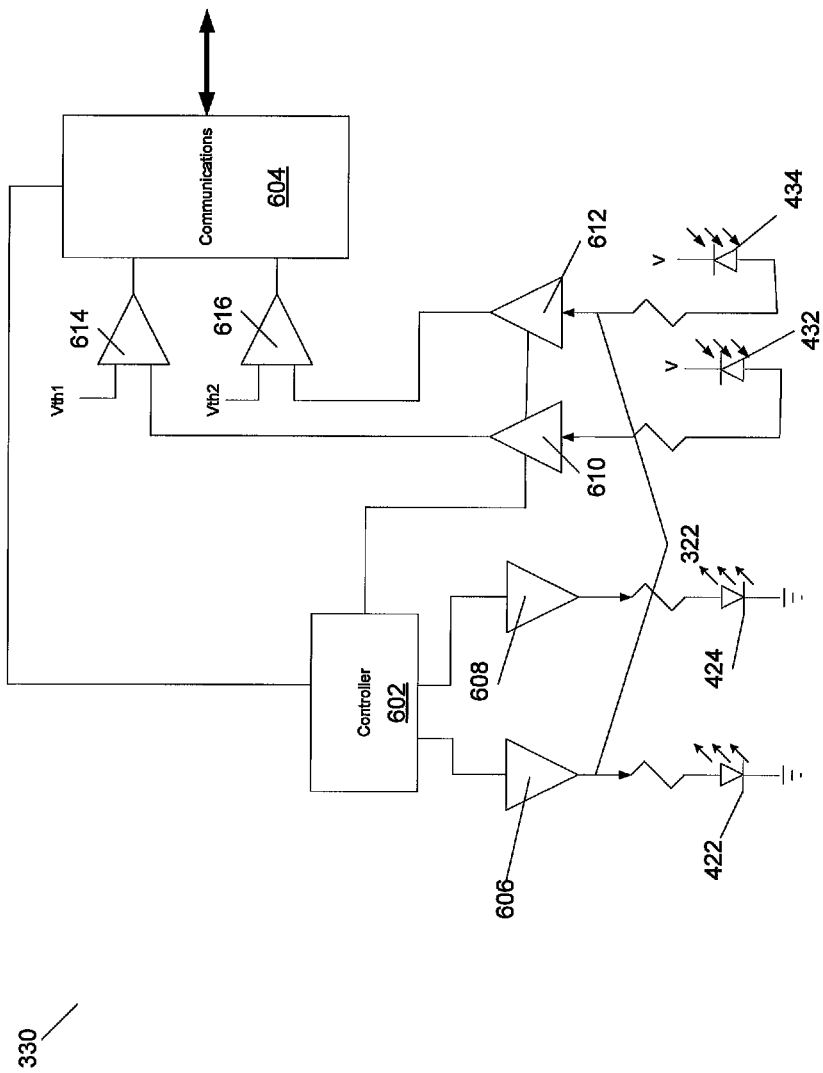
FIG. 6 illustrates an example controller for a quench sensor as shown in FIG. 4.

In the example of electronics 330 shown in FIG. 6, source 422 is a laser diode that emits 970 nm light while source 424 is a laser diode that emits 680 nm light. A driver 606 is utilized to provide power to source 422 while a driver 608 supplies power to source 424. Drivers 606 and 608 are controlled by controller 602. Sources 422 and 424 are only emitting when powered by controller 602 and therefore can be shut down when checks are not being made.

As further shown in FIG. 6, detectors 432 and 434 may be photo diodes. The signals from the photodiodes 432 and 434 may be received by amplifiers 610 and 612, respectively. In comparator 614, the signal from photodiode 432 is compared with a threshold value V$_{th1}$ and the output provided to processor 604. In comparator 616, the signal from photodiode 434 is compared to a threshold value V$_{Th2}$ and the output provided to processor 604. In that fashion, processor 604 can determine when the 970 nm absorption has fallen below a particular value, indicating a lack of FeCl$_2$ in solution 302, and when the 680 nm absorption has risen above a certain value, indicating that solution 306 has risen to an unwanted level.

Processor 604 can then communicate the status of quencher 302 in order that alarms may be sent and service requests transmitted. In some embodiments, electronics 330 is turned on only upon request through processor 604, which saves power. In some embodiments, electronics 330 may continuously operate provided immediate real-time monitoring of quencher 302.

Figure 7:
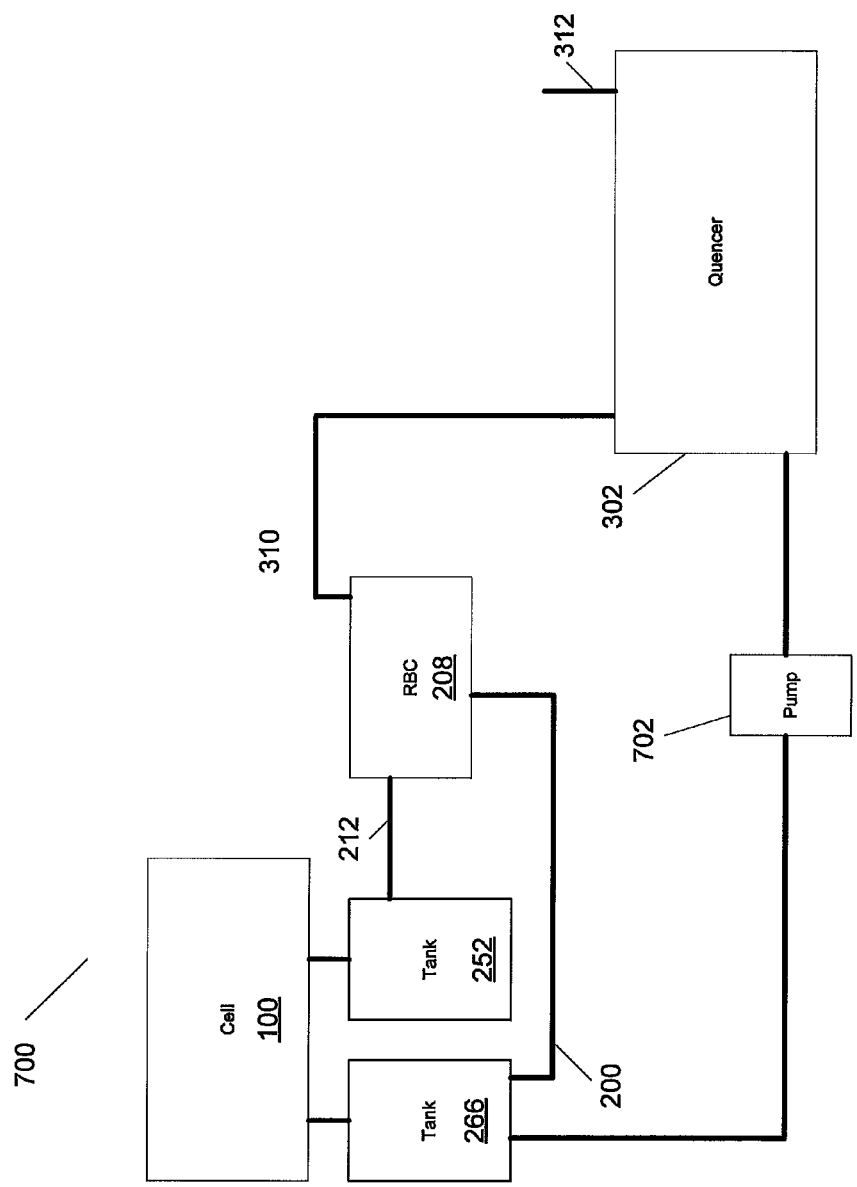
FIG. 7 illustrates an example quencher that exchanges fluid with a storage tank.

As shown in FIG. 7, in some embodiments, quench solution 306 can be added to the electrolyte in tank 266 and quencher 302 refilled from electrolyte tank 266, similarly to the operation of RBC 208 shown in FIG. 2. As shown in FIG. 7, pump 702 provides fluid communication between electrolyte tank 266 and quencher 302. In some embodiments, storage tank 266 holds the FeCl$_2$ solution and storage tank 252 is the CrCl$_3$ solution. The FeCl$_2$ solution stored in tank 266 is then utilized as quench solution 306. In some embodiment, no additional iron filings are added to quench solution 306 during this process. Sensor 320 and electronics can be utilized to trigger draining and refilling quencher 302.

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than restrictive sense. It will, however, be evident that various modifications and changes may be made thereunto without departing from the broader spirit and scope of the invention as set forth in the claims.

What is claimed is:

1. A quench system, comprising:
a quench solution including FeCl$_2$ in a dilute HCl solution;
a container holding the quench solution, the container including an input that directs a gaseous emission into the quench solution; and
a quench sensor including:
a double walled tubing having an open-ended inner volume and a sealed outer volume,
a first light source and a corresponding first detector, and
a second light source and a corresponding second detector, wherein:
the quench sensor is positioned in the container such that before any quenching has begun, the first light source and the corresponding first detector are positioned in the sealed outer volume below a quench solution level, and the second light source and the corresponding second detector are positioned in the sealed outer volume and at a predetermined threshold level above the quench solution level, and
Cl$_2$ gas is removed from the gaseous emission by a reaction with the quench solution.

2. The system of claim 1, wherein the reaction is given by

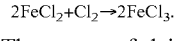

3. The system of claim 1, wherein iron filings are provided to the quench solution.

4. The system of claim 3, wherein a restoration reaction given by

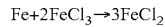

restores FeCl$_2$ in the quench solution.

5. The system of claim 1, wherein the quench solution further includes CrCl$_3$.

6. The system of claim 1, wherein the quench solution, before any quenching has begun, includes 1.5 M FeCl$_2$, 0.2 M CrCl$_3$, and 0.1 M HCl.

7. The system of claim 1, wherein the first light source emits light including an FeCl$_2$ absorption peak wavelength, and the first light source and the corresponding first detector are positioned such that the FeCl$_2$ absorption peak detected through the quench solution is measured.

8. The system of claim 7, wherein a signal generated by the measured FeCl$_2$ absorption peak is compared to a threshold voltage value to determine if an FeCl$_2$ concentration is lower than a predetermined concentration.

9. The system of claim 5, wherein the second light source emits light including a $CrCl_3$ absorption peak wavelength, and the second light source and the corresponding second detector are positioned such that after quenching has begun, the $CrCl_3$ absorption peak detected through a volume of the quench solution is measured.

10. The system of claim 9, wherein the measured $CrCl_3$ absorption peak provides an indication that the quench solution has risen over the predetermined threshold level.

11. The system of claim 1, further including a pump to exchange the quench solution with a stored electrolyte solution of a flow cell battery system.

12. The system of claim 11, wherein the stored electrolyte solution includes $FeCl_2$.

13. The system of claim 1, wherein the quench sensor further includes a stopper provided on one end of the double walled tubing.

14. The system of claim 1, wherein the first and second light sources are mounted on a first circuit board, the corresponding first and second detectors are mounted on a second circuit board, and the first and second circuit boards are attached to the double walled tubing by clamps.

15. The system of claim 1, wherein the first light source emits light including an $FeCl_3$ absorption peak wavelength, and the first light source and the corresponding first detector are positioned such that the $FeCl_3$ absorption peak detected through the quench solution is measured.

16. The system of claim 15, wherein a signal generated by the measured $FeCl_3$ absorption peak is compared to a threshold voltage value to determine if an $FeCl_3$ concentration is higher than a predetermined concentration.

* * * * *